3,230,762
TORQUE MEASURING IN PRELOADED BALL SCREW AND NUT ASSEMBLIES
Leo F. Doran, Clawson, Mich., assignor, by mesne assignments, to Beaver Precision Products, Inc., Clawson, Mich., a corporation of Delaware
Filed Jan. 15, 1963, Ser. No. 251,575
7 Claims. (Cl. 73—133)

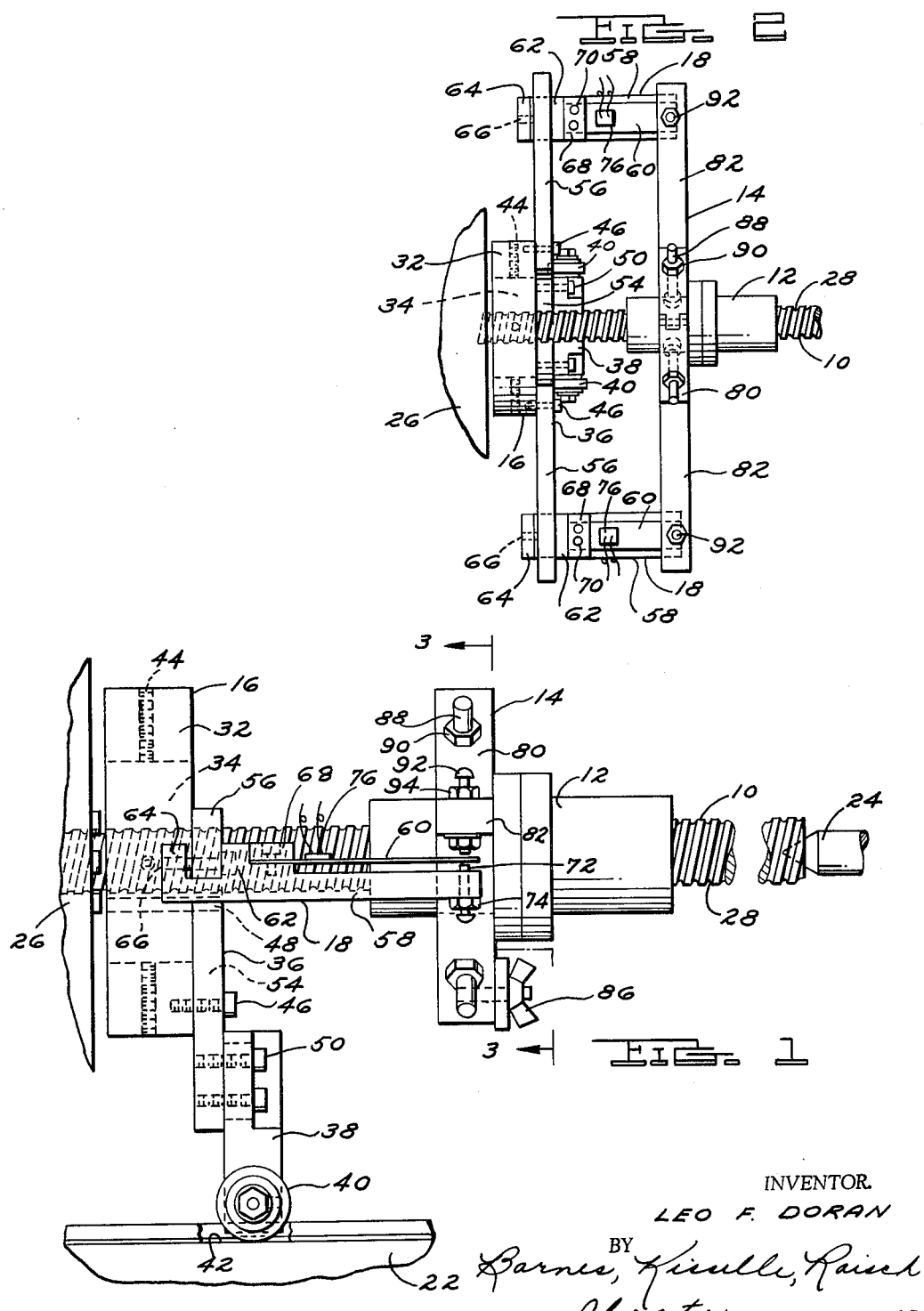

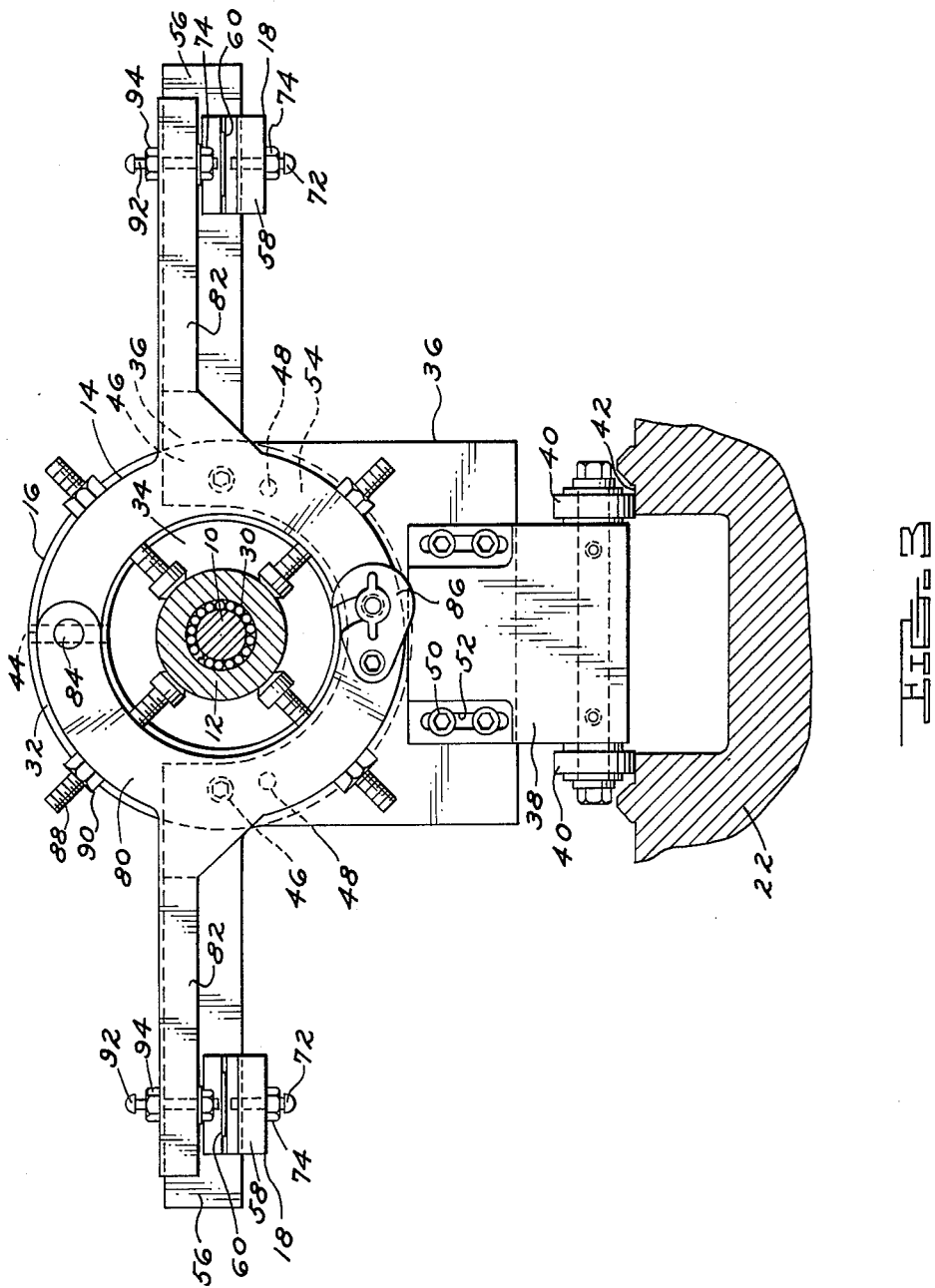

This invention relates to preloaded ball screw and nut assemblies and more particularly, to an apparatus for ascertaining preload torque by measuring the rotational resistance between the screw and nut.

One object of this invention is to provide a measuring device that will accurately indicate rotational resistance or preload torque in a preloaded ball screw and nut assembly, exclusive of other variables which could lead to measuring inaccuracies.

The invention is practiced by rotating the screw, yieldably restraining rotation of the nut and accurately measuring the tendency of the nut to rotationally follow the screw. This following tendency may be measured precisely by establishing a rotationally fixed reference point movable along the axis of the screw, restraining rotation of the nut with one end of a deflectable strain gauge leaf having its other end secured at the reference point, and measuring minute deflections of the leaf.

In the drawings:
FIG. 1 is a side elevation of the measuring apparatus assembled in a conventional horizontal machine tool.
FIG. 2 is a fragmentary top plan of the apparatus shown in FIG. 1.
FIG. 3 is a sectional view taken along line 3—3 in FIG. 1.

The apparatus for checking preload torque of a preloaded specimen ball screw assembly, such as the screw 10 and the nut 12, generally comprises a support frame or test yoke 14, a follower carriage 16, a pair of deflection sensing arms 18, and a conventional machine tool having a bed 22, tailstock center 24 and headstock and chuck assembly 26. Ball screw 10 has a conventional spiral groove 28 of semicircular cross section. Nut 12 is of the conventional ball recirculating type having a plurality of bearing balls 30 (FIG. 3) therein interengaging a spiral groove in the nut with spiral groove 28 of screw 10 to provide a low friction driving connection therebetween. In order to eliminate all backlash from the ball screw assembly the bearing balls are preloaded in any suitable manner. One end of screw 10 is rotatably supported by tailstock center 24 and the other end is mounted for rotation by headstock 26. Follower carriage 16 comprises an annular follower nut support 32, a follower nut 34, a follower yoke 36, and a vertically adjustable leg member 38 having rollers 40 which ride on ways 42 of bed 22. Follower nut 34, preferably made of low friction material such as nylon and having a spiral rib (not shown) conforming to groove 28, threadably engages ball screw 10 and is rigidly retained in follower nut support 32 by set screws 44. Follower yoke 36 is mounted to annular support 32 by screws 46. A plurality of dowel pins 48 rigidly interengage annular support 32 and yoke 36 to prevent relative rotation therebetween. Bolts 50 passing through vertical slots 52 (FIG. 3) adjustably mount yoke 36 and leg 38 so that the height of follower nut 34 can be varied with respect to machine bed 22. Yoke 36 has a U-shaped portion 54 to accommodate screw 10 and a pair of oppositely extending horizontal arms 56 each of which mounts a respective deflection sensing arm 18. Sensing arms 18 each have a flat extension 58, a strain gauge leaf 60, and an enlarged end portion 62 having a hooked-shaped flange 64 provided with a set screw 66 to rigidly mount sensing arms 18 on the outer end of follower yoke arms 56. Strain gauge leaves 60 are rigidly mounted on enlarged portions 62 of each yoke arm 56 by a block 68 and screw 70. Leaves 60 extend parallel to flat extensions 58. A stop pin 72 is threaded in the end of each flat extension 58 remote from enlarged portion 62 and is adjustably locked in place by lock nuts 74. Stop pins 72 limit deflection of strain gauge leaves 60. Suitable devices, such as electrical strain gauges 76 connected to conventional indicators (not shown) are attached at appropriate points along strain gauge leaves 60 to accurately measure deflection by conventional techniques. Test yoke 14 comprises a split annular body 80 and a pair of outwardly extending horizontal arms 82. The split segments of body 80 are hinged at pivot 84 to receive nut 12 and are releaseably locked together by a latch 86. Centering screws 88 are threaded in body 80 and have lock nuts 90 to rigidly mount test yoke 14 on nut 12. A threaded upper restraining pin 92 is mounted in the outer end of each arm 82 and adjustably locked in place by lock nuts 94.

To obtain a measurement of the preload torque on the ball screw and nut assembly ball screw 10 with nut 12 already assembled thereon, is threaded in follower nut 34 and the assembly is mounted in the headstock 26 and tailstock 24. Carriage 16 is clamped on follower 34 by set screws 44. Preloaded nut 12 and the test yoke 14 are moved along screw 10 until upper restraining pins 92 are vertically aligned with lower stop pins 72 (FIG. 1). Restraining pins 92 are adjusted until they contact strain gauge leaves 60 and are locked in position by lock nuts 94. Test yoke 14 is then locked firmly to nut 12 by centering screws 88 and lock nuts 90. A zero setting for the strain gauge and deflection measuring apparatus is then made. Thereafter when ball screw 10 is rotated by headstock 26, the preloaded nut 12 tends to rotate or follow along with ball screw 10. However, rotation of the nut is yieldably restrained by one of strain gauge leaves 60 (depending upon the direction in which the screw 10 is rotated) when it engages its respective restraining pin 92 on test yoke arms 82. As the nut 12 and test yoke 14 tend to rotationally follow ball screw 10, minute rotation of the nut will deflect one of strain gauge leaves 60 proportionately to the torque required to overcome the preload force. For example, if ball screw 10 is rotated counterclockwise as viewed in FIG. 3, ball screw nut 12 and test yoke 14 will tend to follow counterclockwise and deflect the right hand leaf 60 downward as viewed in FIG. 3. Once the breakaway preload torque is overcome, continued rotation of the screw threads follower nut carriage 16 and test yoke 14 in synchronous movement along the screw. Deflection of the leaf during this synchronous movement depends only on running preload torque, i.e., the minute rotational resistance between the nut and the screw.

Using two strain gauge leaves facilitates the measurement of preload torque for both directions of ball screw rotation. Additionally, it will be apparent to one skilled in the measurements art that such an arrangement may be used to obtain oppositely varying strain gauge readings by adjusting upper retaining pins 92 to obtain an initial deflection of the strain gauge leaves at the zero setting. Rotation of the preloaded screw would then increase deflection of one leaf and decrease deflection of the other leaf.

The positioning of the follower carriage and test yoke, with respect to the headstock and tailstock, can be reversed or otherwise modified, so long as the follower nut carriage provides a rotationally fixed reference point that moves along the axis of the screw in synchronous movement with the test yoke. Additionally, while the preferred embodiment is shown in the drawing, positioning of the strain gauges may be varied. For example, arms 82 of test yoke 14 could include strain gauge leaves deflected by pins 72 on flat extensions 58. Deflection measured by the strain gauges may be converted into useful information by conventional measuring techniques including correlation by torque versus deflection curves. Strain gauge measurements may be observed and recorded by conventional measuring apparatus, such as an oscillograph, meter, or recording drum.

I claim:

1. In a testing device for ascertaining the preload torque in a preloaded ball screw and nut assembly comprising means for supporting said screw with the nut thereon for rotation about its longitudinal axis, a test yoke adapted to rigidly embrace said nut and turn bodily with the nut, a reference assembly, said reference assembly being rotatably fixed, means for moving said reference assembly in a direction along the longitudinal axis of said screw in synchronous movement with said nut when said screw is rotated, a deflectable leaf operatively connected between said reference assembly and said test yoke and operable to be deflected by relative rotation between said reference assembly and said test yoke, and means for measuring the deflection of said leaf.

2. The combination as set forth in claim 1 wherein said means for moving said reference assembly comprises a follower nut adapted to be threaded on said screw.

3. The combination as set forth in claim 2 wherein said deflectable leaf has one end thereof rigidly connected to said reference assembly and said test yoke has an arm adapted to engage and deflect the other end of said leaf when said nut of said ball screw assembly tends to rotationally follow said screw.

4. A device for ascertaining preload forces in a preloaded ball screw and nut assembly comprising a fixed machine bed having a headstock and a tailstock adapted to rotatably support the ends of said screw with the nut assembled thereon, a follower nut adapted to be threaded on said screw, a follower nut carriage supporting said follower nut for non-rotational longitudinal movement in a direction along the axis of said screw toward one end thereof, said carriage having an arm, a strain gauge leaf having one end thereof rigidly affixed to said carriage arm and the other end of said leaf extending parallel to said screw toward said one end thereof, a test yoke positioned adjacent said carriage and adapted to mount said nut of said ball screw assembly for non-rotation therewith, said test yoke having an arm adapted to engage and deflect the other end of said leaf when said test yoke tends to rotationally follow said screw, and strain gauge means operatively connected to said leaf to measure deflection thereof whereby upon rotation of said screw said nut of said ball screw assembly tends to rotationally follow said screw, deflecting said leaf until the resistance to rotation between the screw and nut of the ball screw and nut assembly is overcome, and the follower nut then rotates along with the nut of the ball screw assembly, deflecting the leaf in accordance with the torque required to relatively rotate the screw and nut of the ball screw and nut assembly.

5. A device for measuring the relative rotation of a screw and a first nut threaded on said screw, said device comprising a reference nut threaded on said screw and spaced from said first nut, means for holding said reference nut against rotation relative to said screw while permitting the nut to move axially along said screw as the screw is turned, a first element rigidly secured to said first nut to turn bodily therewith, a second element rigidly connected to said reference nut and coupled to said first element, one of said elements being resilient whereby said two nuts tend to move in unison but limited relative rotation of the nuts is permitted, and sensing means for measuring relative rotation between said nuts.

6. A device as defined in claim 5 in which one of said elements is a resilient leaf extending longitudinally along said screw and supported at one end and the other of said elements is an abutment engageable with said leaf adjacent the free end thereof.

7. A device as defined in claim 6 in which said sensing means is operable to measure the deflection of said leaf.

References Cited by the Examiner

UNITED STATES PATENTS

| 2,441,608 | 5/1948 | Warner | 73—133 |
| 2,471,423 | 5/1949 | Gisser | 73—9 |
| 2,484,761 | 10/1949 | Stock | 73—59 |
| 2,586,708 | 2/1952 | Petit | 73—133 X |

RICHARD C. QUEISSER, Primary Examiner.